United States Patent [19]
Herren et al.

[11] Patent Number: 5,841,592
[45] Date of Patent: Nov. 24, 1998

[54] OPTICAL BENCH AND USE THEREOF

[75] Inventors: Andreas Herren, Benglen; Saverio Sanvido, Glattbrugg, both of Switzerland

[73] Assignee: Oerlikon Contraves, Zuerich, Switzerland

[21] Appl. No.: 967,455

[22] Filed: Nov. 11, 1997

[30] Foreign Application Priority Data

Nov. 25, 1996 [CH] Switzerland .............................. 2897/96

[51] Int. Cl.⁶ ...................................................... G02B 7/02
[52] U.S. Cl. ............................................................ 359/819
[58] Field of Search .................................... 359/819, 811, 359/822, 809

[56] References Cited

U.S. PATENT DOCUMENTS 3,112,570 12/1963 Vasconcellos ................................ 35/19
3,985,453 10/1976 Nakano et al. ........................... 356/207

FOREIGN PATENT DOCUMENTS 2 519 270 7/1983 France .
WO 96/10204 4/1996 WIPO .

*Primary Examiner*—Georgia Epps
*Assistant Examiner*—Ricky Mack
*Attorney, Agent, or Firm*—Townsend and Townsend and Crews; Guy W. Chambers

[57] ABSTRACT

The optical bench (10) contains a bench structure (20) and at least two optical units (12, 14, 16) fastened to the bench structure (20), whose axes are essentially oriented at predetermined angles transversely in respect to the bench structure. The bench structure (20) has a receiving element (22, 24, 26) for each optical unit (12, 14, 16), in which an end section of the optical units is fastened. The remaining parts of the optical units (12, 14, 16) freely project away from the bench structure (20) in the direction of their axes (13, 15, 17). In a first variant, the receiving elements are connected by arms, which can be integrated into a thin plate. In a second variant, the optical bench has a radiation shielding plate (50) covering the area of the optical units (12, 14, 16), which is disposed on the side of the bench structure (20) facing away from the optical units (12, 14, 16) and preferably is resiliently fastened, so that bending or tilting of the radiation shielding plate (50) has no effect on the orientation of the axes (13, 15, 17). When using the optical bench (10) in a satellite of a telecommunications device in space, its size is determined by taking the occurring changing loads and the loads encountered during the start phase of the launch rocket into consideration.

8 Claims, 2 Drawing Sheets

OPTICAL BENCH AND USE THEREOF

FIELD OF THE INVENTION

The invention relates to an optical bench with a bench structure and with at least two optical units fastened in the bench structure, with axes, which take up defined angular positions in respect to each other and relative to the bench structure, wherein the end area of each optical unit is fastened in a receiving element disposed on the bench structure and with its remaining area essentially projects transversely away from the bench, and wherein the optical units are essentially oriented transversely in respect to the bench structure. The invention also relates to the use of the optical bench.

BACKGROUND OF THE INVENTION

Optical benches of this type are used for various purposes, among others in terminals of telecommunications satellites. In the course of processing signals in the form of beams, it is of fundamental importance that the orientations of the axes of the optical units seated in the bench structure do not change and are always maintained, independently of deformations of the bench structure because of, for example, thermally caused deformations. In connection with the processing of collimated beams this means that the axes of the optical units must remain parallel.

If the diameter of the optical units is not too large and if materials with sufficient heat conductivity are used, the temperature in their interior is generally sufficiently compensated with a cross section, while in the axial direction temperature gradients and therefore a corresponding heat flux as well as corresponding dilatations must be expected. Since these dilatations are essentially limited to the axial direction of the individual optical units, they would not result in a change of the axis directions if the optical units could expand and retract independently of each other.

For example, a massive plate extending transversely in respect to the axes of the optical units, for example made of glass ceramics, in which the individual optical units were received over approximately their entire length, has been used in connection with customary optical benches up to now. As a result, the optical units were connected with each other over their entire length or over their area received in the plate, so to speak, and therefore were not free to dilate independently of each other. Based on the considerable thickness of the plate, a temperature gradient over the thickness of the plate also had to be expected. The mutual connection of the optical devices over a considerable length, as well as the presence of a temperature gradient in the plate itself resulted in a distortion of the optical units, so that it was not possible to sufficiently maintain the mutually predetermined, in particular parallel and constant orientation of the axes of the optical units. Further disadvantages of the previously known optical benches consisted in that tensions in the plate itself resulted from the thermally caused deformations, and that the great weight of the plates was undesirable, at least in connection with the extraterrestrial use of the optical benches.

Although the thermally caused deformations can be kept small, if materials with minimal coefficients of thermal expansion are used, those materials are generally not employed, especially in large numbers, for reasons of cost. Furthermore, the use of such special materials results in certain interface problems based on the different heat dilatation.

An optical bench is known from French Patent Publication FR-A-2 519 270, whose bench structure essentially consists of three parallel rectangular plates. The first and second plates are connected by means of a reinforcing honeycomb structure to form a double plate. Tubes extend between the double plate and the third plate and are used as receiving elements for optical devices. The third plate contains openings distributed in the form of a grid, of which a defined number is provided with the said tubes, as needed. This arrangement has several disadvantages, in spite of the grid configuration, it is not adaptable, in particular in respect to the receiving elements themselves and therefore in respect to the shape of the optical units to be fastened in the receiving elements, since all receiving elements have the same shape. Because of its rectangular basic shape, the optical bench is given a certain mass and extension, which in many cases is not even necessary. On the other hand, additional reinforcements at possibly highly stressed places are not possible.

OBJECT AND SUMMARY OF THE INVENTION

It is a first object of the invention to produce an optical bench with a bench structure and with at least two optical units fastened in the bench structure with axes which take up defined angular positions in respect to each other and relative to the bench structure, wherein the end area of each optical unit is fastened in a receiving element disposed on the bench structure and with its remaining area essentially projects transversely away from the bench which does not display the disadvantage of the Prior Art.

In accordance with the invention, this first object is attained by the bench structure which has arms arranged to connect the receiving elements which are embodied and arranged in such a way that, in case of heat dilatation of the arms, the receiving elements can be displaced transversely in respect to the axes without tilting, wherein the parallelism and orientation of the axes is not changed.

Like the optical bench of the present invention in FR-A-2 519 270, the novel optical bench is designed in such a way that the optical units are received with only a short end section in the receiving elements, which are a part of the bench structure, for the optical units, while over the entire remaining length they do not have any further mutual contact, so that they individually extend transversely away from the bench structure. Because of that, starting at the receiving elements, the optical units can dilate independently of each other, by which their bending is largely prevented, so that the parallel and unchanged orientation of the axes is not hampered by bending of the optical units or of their tubes. The bench structure itself is laid out in such a way that temperature gradients and therefore heat flux or heat dilatation only occur within the bench structure, i.e. in the direction of its main extension and therefore transversely to the axes of the optical units. Because of this it might be possible to accept that the mutual distances of the axes of the optical units change slightly, however, the parallelism of these axes is maintained. The result of these considerations is the optical bench in accordance with the invention, whose bench structure is essentially constituted by arms which connect the receiving elements. This design of the optical bench or the bench structure is especially advantageous if the cross sections of these arms, which are oriented transversely in respect to the bench structure, are of such a size that, in spite of little wall thickness and preferably large heat conductivity, they have a large moment of inertia in respect to their axes through the center of gravity extending parallel with the bench structure, since because of this the bending of the arms around these axes through the center of gravity, which would result in tilting of the axes of the optical units, is minimized.

The arms proposed by the invention and connecting the receiving elements for the optical units can also be connected with each other by a thin, almost two-dimensional plate, preferably made of a material with a high degree of heat conductivity, or can be integrated into such a plate or constitute elements of such a plate. The arms which connect the receiving elements and are integrated into the plate can constitute a sort of plate-reinforcing ribs in this case. In an advantageous embodiment, the wall thickness of such a plate lies in the range between 5 and 20 mm. Such a plate has essentially the same temperature at every location over its respective entire thickness, so that temperature gradients, heat flux and dilatations occur only in the plane of the plate itself, so that a deformation of the plate and tilting of the optical units is prevented.

For a further reduction of the weight, such a flat and therefore light bench structure can have openings in areas which are not or only slightly stressed, or it can be embodied to be grid-like. On the other hand, if needed, the plate can have the already mentioned reinforcing ribs extending along the places of the connections of the receiving elements and formed by reinforced arms, as well as further reinforcing ribs.

Corresponding steps can be taken for fastening the optical bench on further structural elements. For example, the bench structure can have flanges, which extend in its plane or are bent out of this plane. Bench structures in the form of or with thin plates can have integral flanges made from the plate material, which allows a simple production by means of non-cutting forming, without welding, soldering or gluing operations.

Aluminum as well as suitable aluminum alloys have been shown to be a practical material for the bench structure, since it has a high degree of heat conductivity, a low specific weight, problem-free working and a comparatively advantageous cost.

A further problem occurring in particular with the use of optical benches in space, lies in the high-energy radiation to which the optical units are exposed. Therefore a particularly advantageous embodiment of the above described optical bench has a shielding plate, which advantageously covers at least the area of the optical units and which usefully is located on the side of the bench structure which is opposite the optical units.

The just mentioned problem of the jeopardy to which the optical units are exposed by high-energy radiation, of course occurs in connection with all optical benches, i.e. not only the optical benches so far described.

It is therefore a second object of the invention to propose an optical bench with a bench structure and with at least two optical units fastened in the bench structure with axes, which take up defined angular positions in respect to each other and relative to the bench structure and are essentially oriented transversely in respect to the bench structure, wherein a protection of the optical units against the said high- energy radiation is provided.

This second object is attained in accordance with the invention by means of a radiation shielding plate arranged on the side of the bench structure facing away from the optical units, which covers the area of the optical units.

Thus, an optical bench of that type has a radiation shielding plate, which is approximately embodied and arranged the same as the radiation shielding plate described in connection with the novel bench structure.

So that a radiation shielding plate of this type does not hamper the directionally fixed and possibly parallel arrangement of the axes of the optical units, it must be fastened in such a way that in case of a tilt out of the plane of the plate, possibly caused by heat, the mutual angular position of the optical units and the orientation of their axes in relation to the bench structure is retained as much as possible. Although adjustable mutual fastenings of different plates are known from International Patent Publication WO 96/10204, the fastenings mentioned there are not elastic, with the exception of course of the naturally always present elasticity of the material per se, and instead result in an adjustable, but fixed connection.

In order to fasten the radiation shielding plate in the desired manner on the bench structure, a resilient element must be located between the radiation shielding plate and the bench structure.

For example, the radiation shielding plate can be disposed at a distance from the bench structure, which at least corresponds to the maximum expected deformation or tilting of the radiation shielding plate in the direction toward the bench structure, and a yielding, possibly elastic fastening of the radiation shielding plate is provided.

A suitable mutual fastening of the bench structure and the radiation shielding plate can also consist of the spot use of an elastic adhesive, such as silicon, by means of which it is possible to absorb a certain amount of shearing.

It is particularly advantageous if further optical units arranged on the radiation shielding plate, in particular for collimated coincident incoming and outgoing light beams, are arranged in such a way that in case of tilting of the shielding plate an automatic correction occurs, by means of which the coincidence of the incoming beam with the outgoing beams is maintained.

As already mentioned several times, the optical benches in accordance with the invention are particularly suited for uses in connection with collimated light. They find special use as components of telecommunications satellites in space, where special problems arise. Among others and in contrast to numerous terrestrial uses, not only a static, but also a dynamic load must be expected, and furthermore noticeably different loads occur during the start phase of the launch rockets than during later use.

The third object of the invention relates to the specific design of the optical bench for use in space.

This third object is attained by means of a bench structure whose size is determined by the dynamic loads at the start phase of a rocket launch.

When determining the sizes of the individual components of the optical bench and its connections, the dynamic loads occurring during use as well as during the start phase of the launch rocket must therefore be taken into consideration.

The already mentioned, as well as further aspects of the invention will be extensively described in what follows by means of an exemplary embodiment of an optical bench, making reference to the drawings.

DETAILED DESCRIPTION OF THE PREFERRED EMBODIMENT

Figure 1:
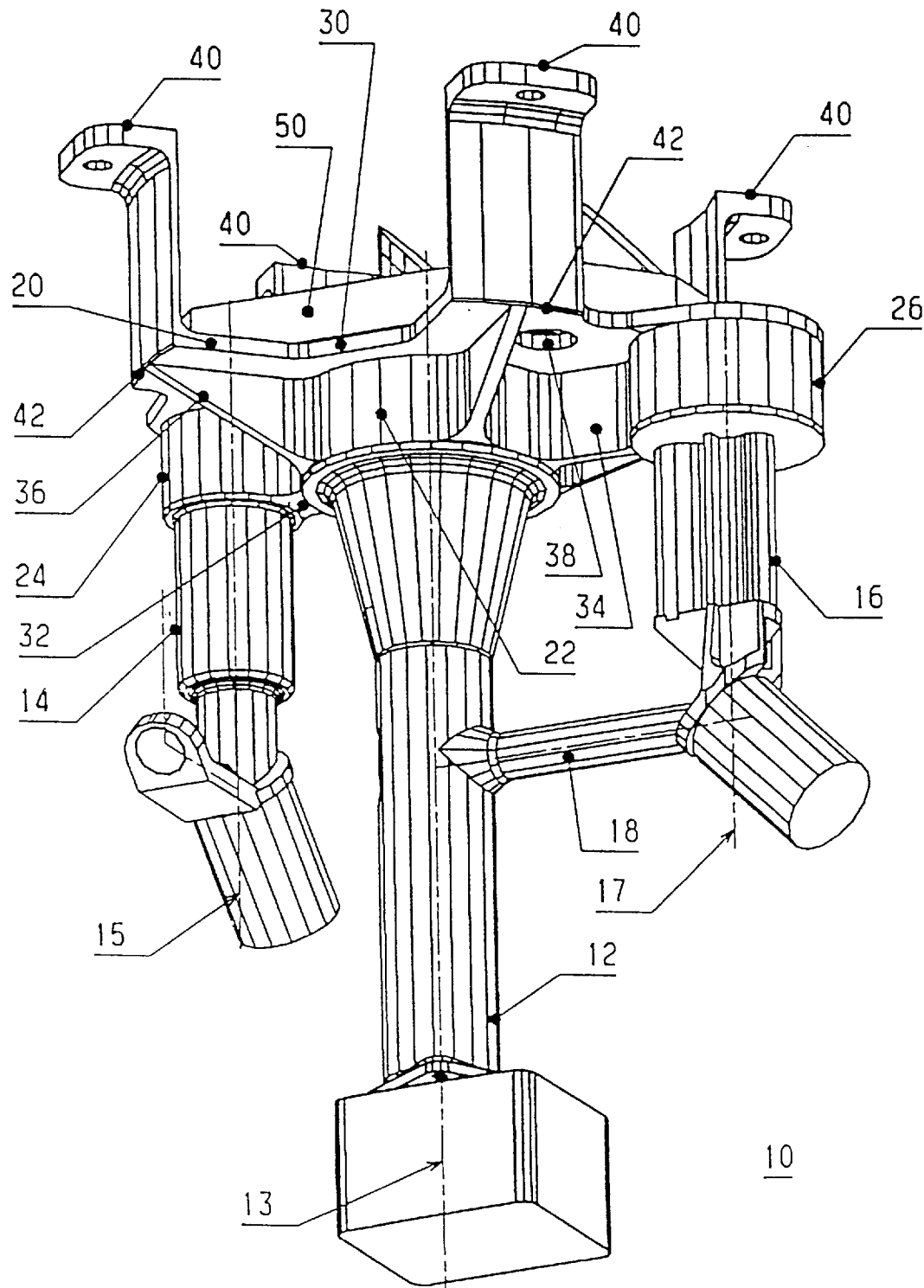
FIG. 1 shows a graphical representation of an optical bench, wherein the side of the bench structure equipped with optical units is visible.
Figure 2:
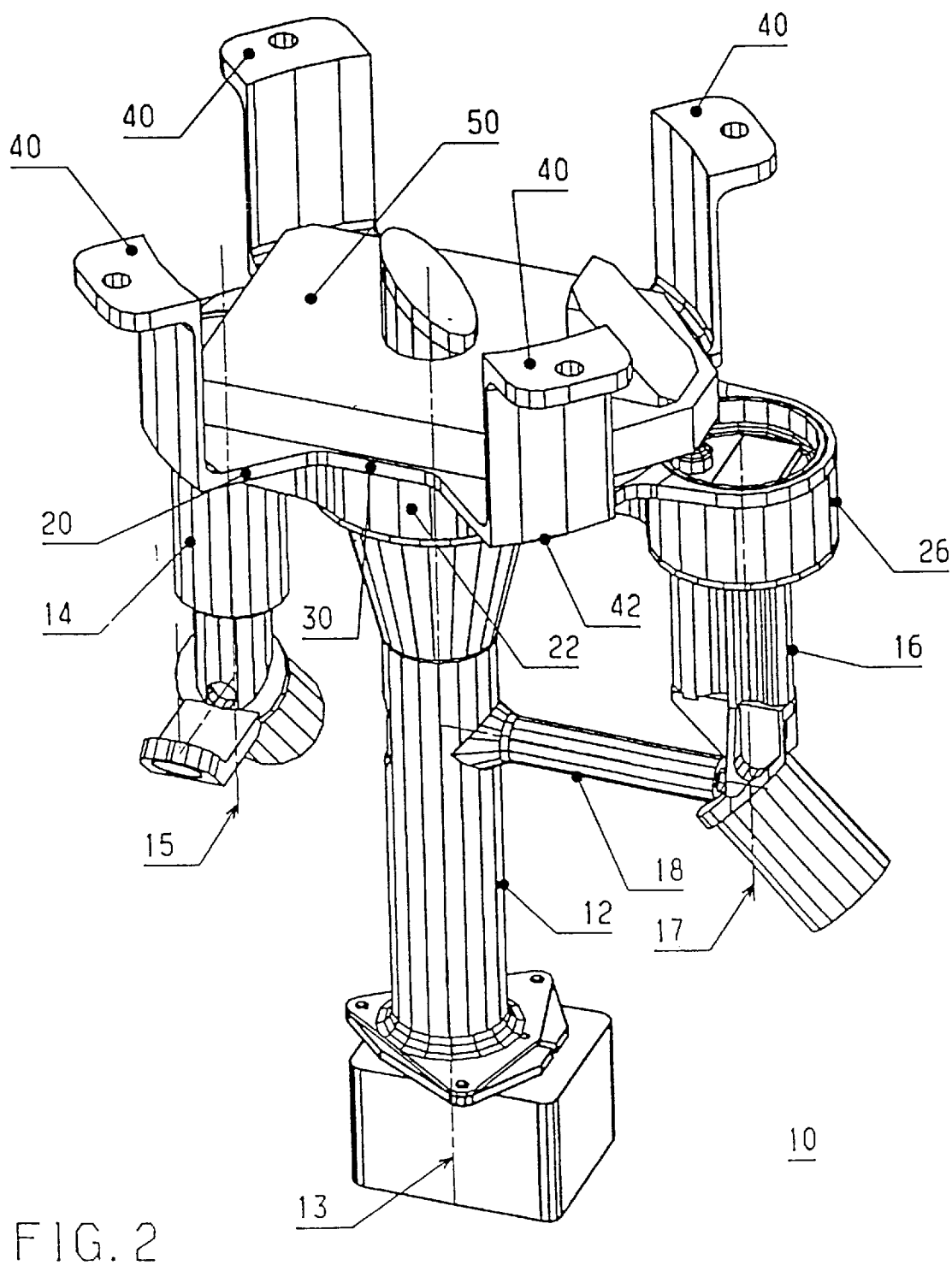
FIG. 2 shows the optical bench represented in FIG. 1, also in a graphical representation, wherein the side of the bench structure facing away from the optical devices is visible.

The optical bench 10 represented in FIGS. 1 and 2 has three optical units 12, 14, 16 and a bench structure 20.

By means of their end sections, located at the top in FIGS. 1 and 2, each one of the optical units 12, 14, 16 is received in a receiving element 22 or 24 or 26 of the bench structure 20, wherein the axes 13, 15, 17 of the optical units 12 or 14 or 16 are oriented parallel, so that the optical bench 10 is suitable for processing collimated radiation. The three optical units 12, 14, 16 are only connected via their receiving elements 22, 24, 26 and the bench structure 20, while they extend away independently of each other from the bench structure 20 with their free ends, located at the bottom in FIGS. 1 and 2. To prevent misunderstandings, it should be particularly pointed out that the angled portion beam 18 of the optical unit 12 ends free and is not mechanically connected with the optical unit 16.

As already mentioned, the bench structure 20 has the receiving elements 22, 24, 26. These are disposed on a thin plate 30 extending transversely in respect to the axes 13, 15, 17.

Arms 32 or 34 with cross sections, which remain the same over their length and project away from the plate 30, extend between the receiving elements 22, 24 or 22, 26, which constitute arms, so to speak, connecting the receiving elements 22, 24 or 22, 26. The plate 30 is furthermore reinforced by several ribs 36, which extend with a tapering cross section from the receiving elements 22, 24, 26 to the edge of the actual plate 30. The plate 30 finally contains cutouts, only one cutout of which is represented as the opening 38.

It can be seen in FIG. 2 that the plate 30, and therefore the bench structure 20, has four integrated, bent away flanges 40, by means of which the optical bench 10 can be fastened at another location. The already mentioned reinforcing ribs 36 are arranged in such a way that they terminate at the edge of the flat area of the bench structure 20 in the center of the attachment line 42 of the flanges 40.

It can also been seen in FIG. 2 that on the side of the plate 30 opposite the optical units 12, 14, 16 an orthogonal radiation shielding plate 50 is disposed, which is parallel in respect to the plate 30 and therefore to the axes 13, 17, 19, and which covers the area of the optical units 12, 14, 16 and shields them from high-energy radiation.

What is claimed is:

1. An optical bench with a bench structure and at least two optical units fastened to the bench structure having axes which take up defined angular positions with respect to each other and relative to the bench structure, wherein each optical unit is fastened to a receiving element disposed on the bench structure and with its remaining area essentially projecting transversely away from the bench, wherein the improvement comprises:

the bench structure having arms arranged to connect the receiving elements, which receiving elements are embodied and arranged in such a way that, in case of heat dilatation of the arms, the receiving elements are displaced transversely with respect to the axes, without tilting, wherein the defined angular position of the axes is not changed.

2. The optical bench in accordance with claim 1, wherein the arms of the bench structure which connect the receiving elements, are integrated into a thin plate extending transversely with respect to the axes and said thin plate is made of a material with a high degree of heat conductivity and by the effects of heat is dilated without bending in the main direction of the plate.

3. The optical bench in accordance with claim 2,
   wherein
   the plate is provided with reinforcing ribs and or with cutouts.

4. The optical bench in accordance with claim 1, wherein
   a radiation shielding plate is arranged on the side of the bench structure facing away from the optical units, which covers the area of the optical units.

5. The optical bench in accordance with claim 1, wherein
   the bench structure has integrated flanges for fastening the optical bench.

6. The optical bench in accordance with claim 1, wherein
   the axes of the optical units are oriented perpendicularly with the bench structure.

7. An optical bench for a rocket in accordance with claim 1 whose bench structure size is determined by the dynamic loads at the start phase of a rocket launch.

8. An optical bench with a bench structure and at least two optical units fastened to the bench structure having axes that take up defined angular positions with respect to each other and relative to the bench structure which are essentially oriented transversely with respect to the bench structure, wherein the improvement comprises:

a radiation shielding plate is resiliently fastened to the bench structure on the side of the bench structure facing away from the optical units in order to prevent a change in the orientation of the axes of the optical unit in case of tilting or deformation of the radiation shielding plate wherein on the side of the radiation shielding plate facing away from the bench structure, a further optical unit and an angled portion beam, which coincide in a straight line, are arranged in such a way that, when the radiation shielding plate is tilted out of the plane of its plate, the coincidence of the angled portion beam is maintained.

* * * * *